(12) United States Patent
Goli et al.

(10) Patent No.: US 6,418,543 B1
(45) Date of Patent: Jul. 9, 2002

(54) APPARATUS AND METHOD FOR DEBUGGING SOURCE CODE

(75) Inventors: Srinivas R. Goli, San Jose; Subramaniyan Sundararajan, Fremont; Aruna Tammana, Santa Clara, all of CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/115,151

(22) Filed: Jul. 14, 1998

(51) Int. Cl.[7] .................................. G06F 11/26
(52) U.S. Cl. ............................ 714/38; 717/4
(58) Field of Search ....................... 714/38, 45, 46, 714/57; 717/4; 712/227; 700/26

(56) References Cited

U.S. PATENT DOCUMENTS

| | | | | |
|---|---|---|---|---|
| 5,487,169 A | * | 1/1996 | Vraney et al. | 717/7 |
| 5,513,315 A | * | 4/1996 | Tierney et al. | 714/37 |
| 6,003,143 A | * | 12/1999 | Kim et al. | 714/38 |
| 6,058,493 A | * | 5/2000 | Talley | 714/38 |
| 6,161,216 A | * | 12/2000 | Shagam | 717/4 |

* cited by examiner

Primary Examiner—Scott Baderman
(74) Attorney, Agent, or Firm—Beyer Weaver & Thomas LLP

(57) ABSTRACT

A method and apparatus for debugging a set of source code is disclosed. A plurality of test commands for testing the source code are obtained. The plurality of test commands may be obtained from a test script or a log file. A set of debugging commands for executing a set of the plurality of test commands is provided. The source code is then tested using the set of debugging commands.

38 Claims, 14 Drawing Sheets

APPARATUS AND METHOD FOR DEBUGGING SOURCE CODE

BACKGROUND OF THE INVENTION

1. Field of the Invention

The present invention relates generally to an automated tool for debugging a set of source code. More particularly, the present invention relates to a tool for debugging networking software using a test script.

2. Description of the Related Art

In a network, a number of computers are connected by transmission lines and switching elements. These switching elements are specialized computers used to connect two or more transmission lines and provide a mechanism for selecting one of the transmission lines each time a packet is transmitted. Common examples of switching elements are "routers" and "bridges". Accordingly, the terms "switching element" and "router" are hereinafter used interchangeably.

Each router includes an operating system, or networking software. In order to verify that the router is functioning properly, the networking software must be adequately tested. Typically, this testing is a manual process during which a set of test commands are entered by a test engineer. During a test session, a log file is often recorded which includes the set of test commands and associated outputs. Searching the log file for error messages is traditionally performed manually. A log file may contain thousands of lines and searching through the log file for error messages can be a tedious process. Moreover, once pertinent commands are obtained from these log files, these commands must be manually reentered to recreate the testing scenario. Accordingly, the debugging of source code can be a time-consuming and cumbersome task.

Various debugging products are available for debugging source code written in various languages (e.g., C, C++). Using these debugging products, the values of various variables may be traced and lines of code may be stepped through to assist in debugging this source code. Such debugging tools commonly accept a program, or "source code", as input and execute it at the user's desired pace, displaying the source code commands that were executed and outputs resulting from these executed commands (e.g., debug information and program output).

Although debugging tools typically accept the program to be debugged as input, debugging tools traditionally do not accept a log file as input for further testing of the source code that originated the log file or other source code. Moreover, debugging tools traditionally provide a set of debugging commands used to step through a portion of source code in order to debug the source code. However, such debugging tools have not been used to step through a test script or log file associated with a test script in order to test a separate set of source code such as networking software.

During testing of networking software, it is often necessary to test multiple code versions of the networking software, retest the networking software, or test different networking software which are likely to contain similar problems. In addition, since such errors may be due to hardware as well as software problems, it may be desirable to run the networking software on different test beds to ascertain the source of the problem. By way of example, if a test fails on two similar test beds, it can be inferred that the source of the problem is hardware related.

One of the most crucial aspects of the debugging process performed by an engineer is the creation of an error report. Without such a report, it would be impossible to track exactly which tests were performed and which of these tests failed. Moreover, it is imperative that the source code (e.g., version), configuration information, and hardware on which the source code is tested be carefully documented so that the test results may be reproduced at a later date. Typically, once testing is completed, the engineer performing the testing will prepare an error report documenting the test session. However, manual entry of such information is a time-consuming process. Therefore, it would be desirable if an error report could be generated automatically with little or no input from the engineer performing the testing.

In view of the above, it would be beneficial if an automated debugging tool were provided which would allow an engineer to recreate test situations to aid in ascertaining the cause of failure while testing a set of source code (e.g., networking software). In addition, it would be desirable if selected test commands obtained from a test script or associated log file could be rerun on the set of source code, or alternatively, used to test other sets of source code. Moreover, it would be beneficial if relevant commands that would aid in the debugging process could be provided.

SUMMARY OF THE INVENTION

The present invention provides a method and apparatus for debugging source code. This is accomplished through providing a set of debug commands designed to apply a set of test commands to the source code. The set of test commands may be obtained directly from a test script or from a log file created after executing the test script on a test bed running the source code to be debugged.

A method and tool for debugging a set of source code is disclosed. The source code may include communication software adapted for enabling communication between a set of devices. By way of example, the communication software may include networking software installed on a router. A plurality of test commands for testing the source code are obtained. The plurality of test commands may be obtained from a test script or a log file which contain the exact sequence of test commands needed to recreate the particular test scenario. For example, if the test script cannot be sequentially executed, a log file associated with the test script may be used.

A set of debugging commands for executing a set of the plurality of test commands is provided. The set of debugging commands include device commands and commands designed to assist in the debugging process. The device commands are designed to execute one or more commands on the test bed (e.g., device) running the source code. Device commands may include new test commands as well as commands designed to execute a set of the plurality of test commands. In contrast, the debug commands designed to assist in the debugging process provide information to assist in the debugging process, and are not run on the source code.

The source code is then debugged using the set of debugging commands. Through the debugging commands, selected ones of the plurality of test commands and new commands entered by a user may be executed on the source code. Output is obtained from the source code. This output may then be displayed. Moreover, the output associated with the execution of test commands may be logged in a log file or error report.

The advantages of the present invention are numerous. The present invention may be used to test source code such as networking software in a more efficient manner than traditional methods. Similarly, the present invention provides considerable time saving advantages while testing multiple versions of source code. In addition, the debugging tool may be used with various platforms, or test beds, to identify the source of a problem (e.g., hardware or software). Moreover, the present invention may be used to automatically generate an error report and other log files corresponding to a test session. In this manner, the time required to test source code may be substantially decreased. As a result, the production costs associated with testing source code may be significantly reduced.

DETAILED DESCRIPTION OF THE PREFERRED EMBODIMENTS

Those of ordinary skill in the art will realize that the following description of the embodiments of the present invention is illustrative only and is not intended to be in any way limiting. Rather, it is intended that the invention be limited only by the appended claims. Other embodiments of the invention will readily suggest themselves to such skilled persons from an examination of the within disclosure.

The present invention provides a method and system for testing source code using a set of test commands which are executed through the application of debugging commands. The set of test commands may be obtained from a test script where each command within the test script is run sequentially. Alternatively, the set of test commands may be obtained from a log file generated as a result of running the test script on the source code. This invention is particularly applicable where source code providing communication between a number of devices is being tested by the set of test commands.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a distributed system between coupled computer systems so that the computer readable code is stored and executed in a distributed fashion.

Figure 1:
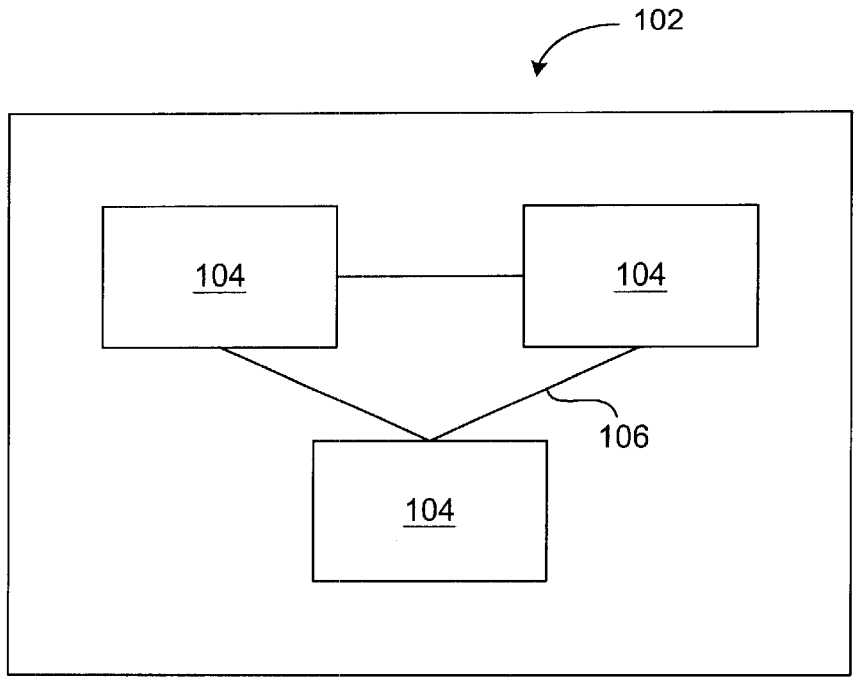
FIG. 1 is a diagram illustrating a test bed 102 on which the present invention may be implemented according to one embodiment.

Referring first to FIG. 1, a test bed 102 on which the present invention may be implemented according to one embodiment is illustrated. As shown, the test bed 102 may include two or more devices 104 which are connected by transmission lines 106. For example, the devices 104 may include at least one device being tested coupled to another device such as a computer. Each one of the devices 104 being tested includes source code adapted for communicating between the devices. According to one embodiment, the devices 104 include routers and the source code is networking software. Moreover, each of these routers may include a separate set of networking software. In this manner, each set of networking software installed on the routers may be tested by monitoring the communication across the transmission lines.

Figure 2:
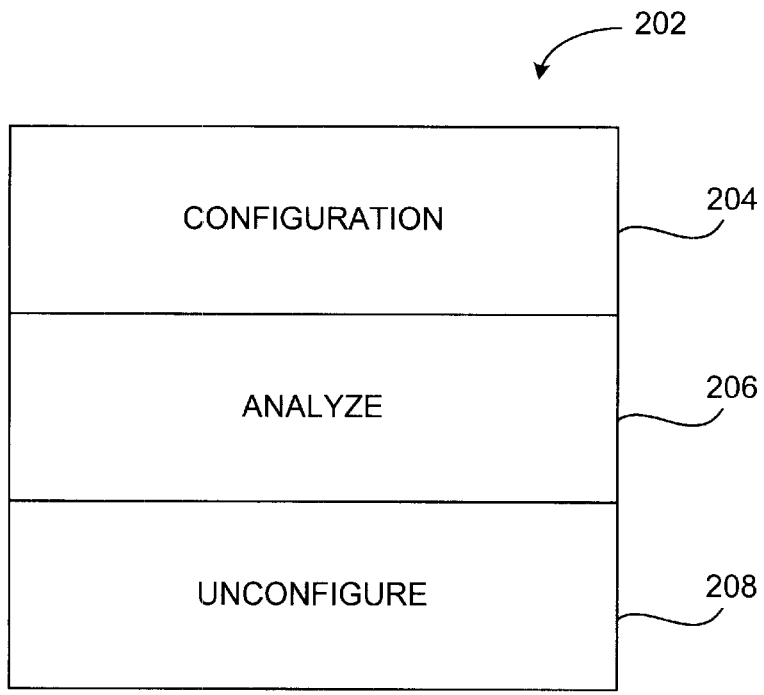
FIG. 2 is a diagram illustrating an exemplary test script 202 according to one embodiment of the present invention.

Referring next to FIG. 2, an exemplary test script 202 according to one embodiment of the present invention is illustrated. The test script 202 is associated with a test case and includes test commands used to test source code. The source code may include communication software which enables communication between a set of devices, such as networking software installed on a router. As shown, the test script 202 includes a configuration section 204 containing configuration commands, an analyze section 206 containing analyze commands, and an unconfigure section 208 containing unconfigure commands. By way of example, configuration commands may include commands for preparing a set of devices for testing (e.g., configuring a router for a particular protocol such as the Internet Protocol or assigning an IP address to an interface through which a packet may be transmitted), analyze commands may include commands for testing the source code (e.g., transmitting a packet to an IP address or displaying a routing table), and unconfigure commands may include commands reversing the configuration commands (e.g., disabling the configured protocol). However, the test script 202 may also include alternate or further types of commands necessary to test a particular set of source code.

The test script 202 may be used as an input to the present invention. However, the test script 202 may be designed to run only a subset of the test commands in accordance with various parameter values (e.g., router protocols). If the test script is designed in this manner, the test script will not be run sequentially, and it will be difficult to recreate a testing session from this test script. In this situation, a log file generation tool may be used to generate a log file by running the test script 202 against the source code. The log file may then be selected and used for further testing.

Figure 3:
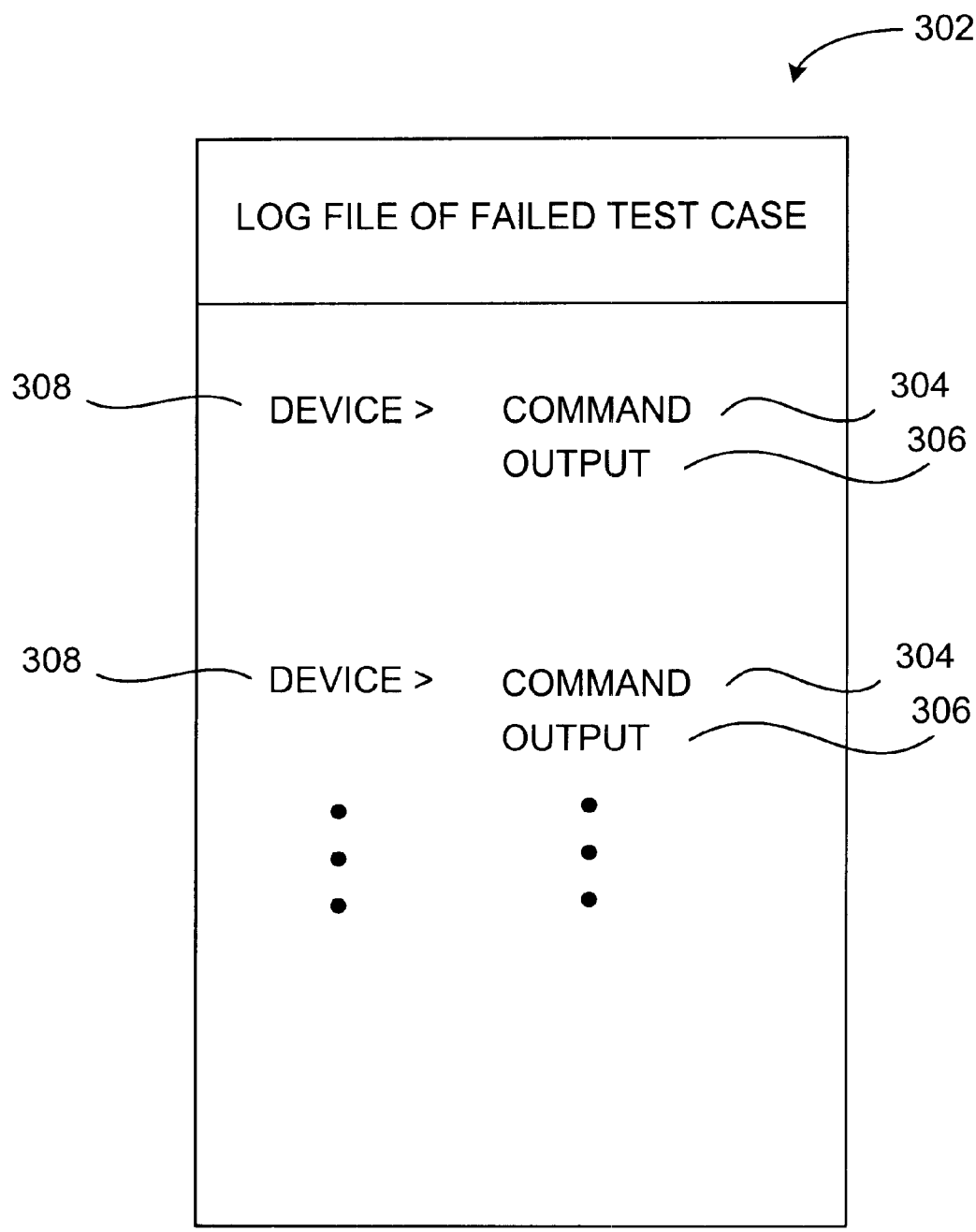
FIG. 3 is a diagram illustrating an exemplary log file 302 according to one embodiment of the invention.

Referring now to FIG. 3, an exemplary log file 302 according to one embodiment of the invention is presented. Typically, a log file 302 includes a plurality of commands 304. Each one of the plurality of commands 304 may have an associated output 306. In addition, the command may include a device identifier 308 (e.g., router name) identifying a device on which the command is to be executed. The plurality of commands 304 and any associated output 306 may be delimited by various character strings.

Figure 4:
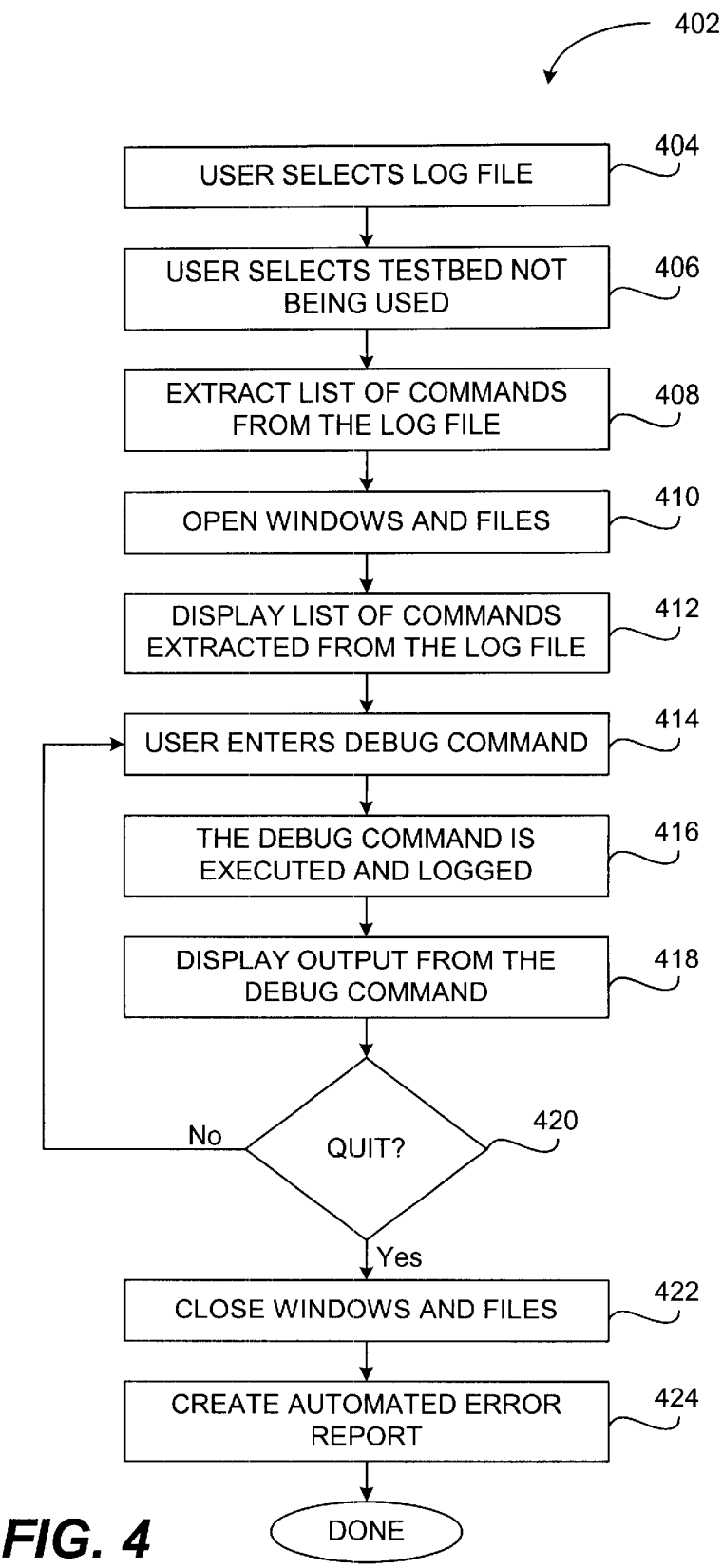
FIG. 4 is a flow diagram illustrating a method for debugging source code 402 according to one embodiment of the present invention.

Referring next to FIG. 4, a method for debugging source code 402 according to one embodiment of the present invention is illustrated. First, at step 404, a log file is selected. Next, at step 406, a test bed is selected. The test bed may include a set of one or more devices having communication software enabling communication between the set of devices. According to one embodiment, the communication software includes networking software installed on a router. Once the test bed has been selected, the communication software may be tested.

Next, at step 408, the plurality of commands are extracted from the log file. Once the commands are extracted, the extracted commands may be stored in a linked list, array or other data structure. Alternatively, the commands could be executed directly from the log file. However, since the commands provided in the log file may not be sequential, parsing the commands during execution would be difficult. At step 410, window displays and files to be created during the testing session are opened. Once the plurality of commands are. extracted from the log file, the extracted commands are displayed at step 412. In addition, the log file may be displayed for user reference.

Next, control is passed to the user and a debug command is obtained from the user at step 414. The debug command may include a device command (e.g., a "STEP" command) used to run a set of the extracted commands or a new command on one or more devices included on the test bed. Alternatively, the debug command may include a command designed to assist in the debugging process (e.g., "SHOW ALIASES" displays all command aliases defined by the user during the debugging session).

At step 416, the debug command is executed and the output is logged. In addition, the associated test commands are logged. Next, at step 418, output from the debug command is displayed. At step 420, if the user does not choose to quit, the process continues at step 414. However, if the user chooses to quit, windows and files created during the testing session are closed at step 422. An error report is then generated at step 424. Since a user is typically required to fill out the error report manually, this substantially increases the efficiency of the debugging process.

Figure 5:
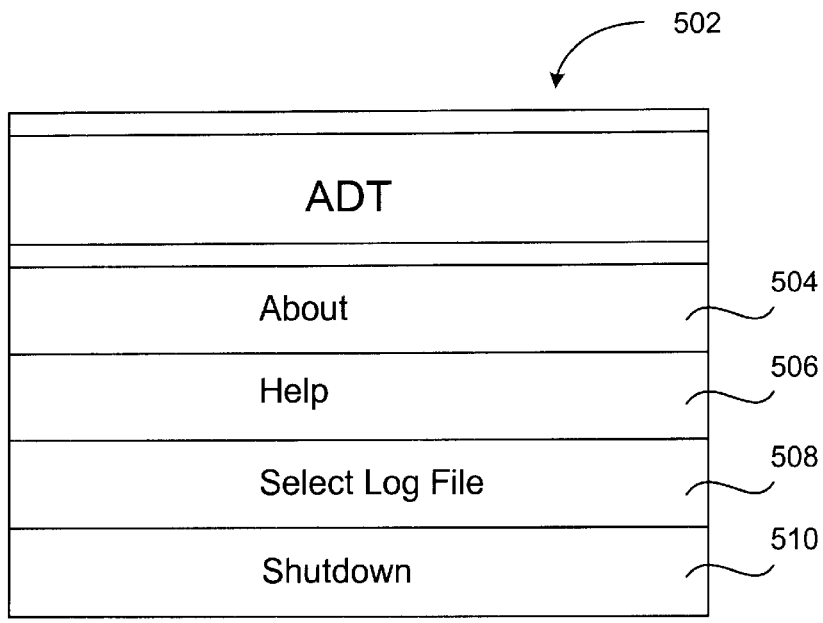
FIG. 5 is a diagram illustrating a user interface provided as a main window 502 in accordance with one embodiment of the present invention.

Referring next to FIG. 5, a user interface provided as a main window 502 in accordance with one embodiment of the present invention is illustrated. A user may select "ABOUT" 504 to ascertain information about the debugging tool. For example, information such as version number and other system information may be provided. In addition, a "HELP" option 506 is provided to assist the user in using the debugging tool of the present invention. For example, the user may obtain a list of all debug commands which will be recognized by the present invention. A "SELECT LOG FILE" option 508 is provided to allow a user to select a log file for use in debugging a set of source code. However, as described above, the system may also be modified to select a test script where the test script is run sequentially. In addition, a "SHUTDOWN" option 510 may be selected to exit the program.

Figure 6:
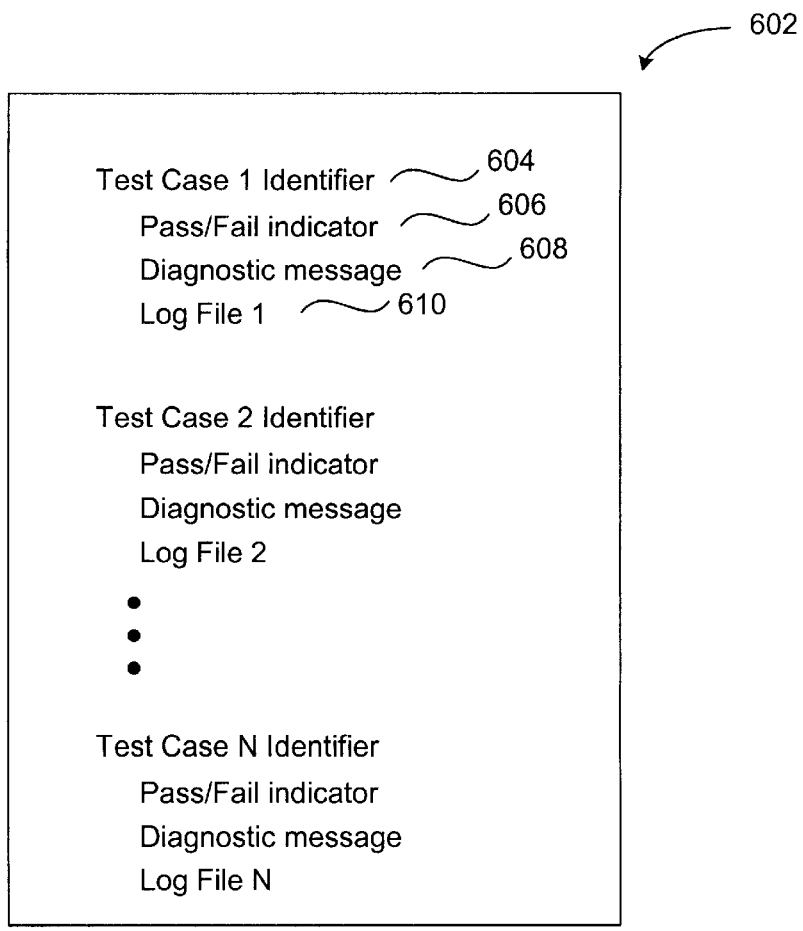
FIG. 6 is a diagram illustrating an exemplary user interface 602 used for selecting a log file in accordance with one embodiment of the present invention.

Referring now to FIG. 6, an exemplary user interface 602 used for selecting a log file in accordance with one embodiment of the present invention is illustrated. When the "SELECT LOG FILE" option of FIG. 5 is selected, a window such as that of FIG. 6 is displayed. As shown, a test case identifier 604 is provided for each test case. The test case identifier 604 may further include a line number for selecting the test case. For each test case, a pass/fail indicator 606 indicating whether the test case passed or failed, a diagnostic message 608 indicating a reason that the test case failed, and a corresponding log file 610 may be included in a summary or archive file created by the log file generation tool.

Figure 7:
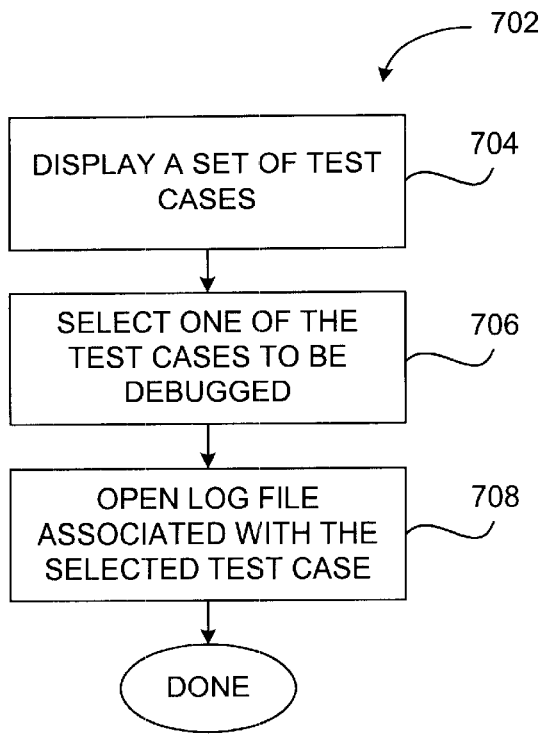
FIG. 7 is a flow diagram illustrating a method for selecting a log file 702 according to one embodiment of the present invention.

Referring now to FIG. 7, a method for selecting a log file 702 according to one embodiment of the present invention is illustrated. At step 704, a set of test cases are displayed. Each test case will correspond to a log file. The information provided to the user will vary according to the log file generation tool used to create the log file. This displayed information will assist a user in selecting a test case to be debugged. For example, the test case may be identified through a line number associated with the beginning of the test case.

At step 706, a log file is selected. By way of example, a user may wish to select a log file corresponding to a failed test case. The failed test case may be identified through visually scanning the log files. Alternatively, an indication that a test case has failed may be provided by the tool which created the log file. For example, information displayed for each test case may include a test case identifier, an output summary (i.e., an indication that the test passed or failed) and brief diagnostic message (i.e., reason that the test failed). Next, at step 708, a log file associated with the selected test case is opened.

Figure 8:
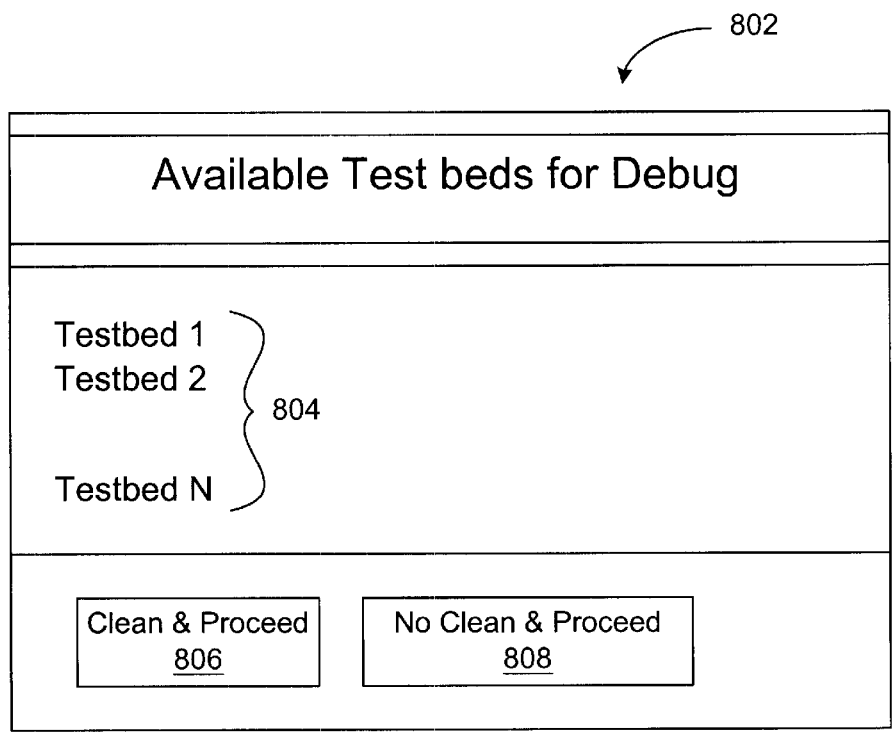
FIG. 8 is a diagram illustrating a user interface for selecting an available test bed 802 according to one embodiment of the invention.

Referring now to FIG. 8, a user interface for selecting an available test bed 802 according to one embodiment of the invention is provided. A list of available test beds 804 are provided for selection. The user may elect to clean the test bed 806 (e.g., install new source code on the test bed), or not clean the test bed 808 (e.g., leave the test bed in its current state). The system then proceeds to allow the user to debug the source code installed on the test bed.

Figure 9:
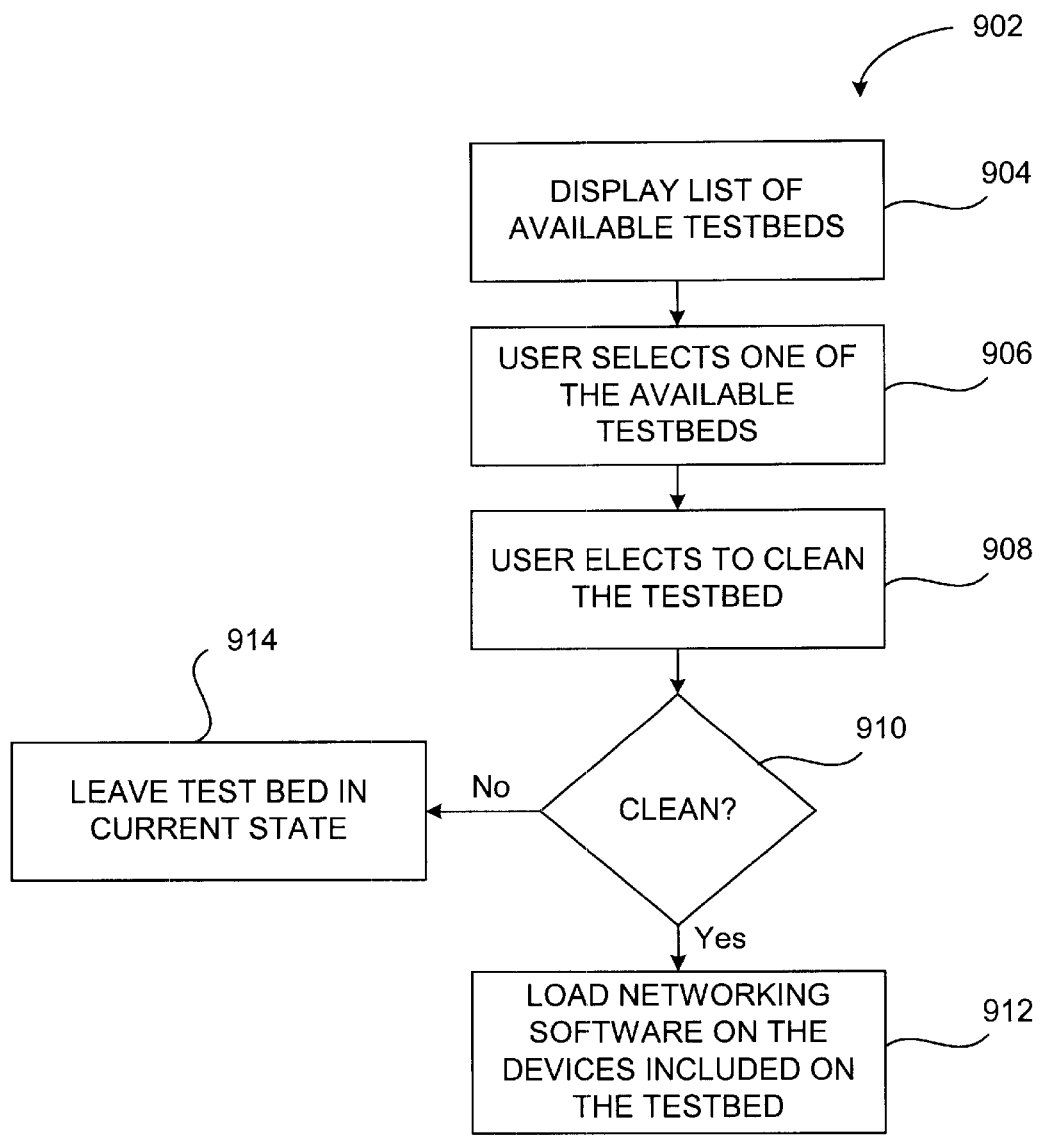
FIG. 9 is a flow diagram illustrating a method for selecting a test bed 902 according to one embodiment of the present invention.

Referring next to FIG. 9, a method for selecting a test bed 902 according to one embodiment of the present invention is presented. A list of available test beds is displayed for selection at step 904. At step 906, a test bed is selected from the list of available test beds by the user. At step 908, a user may elect to clean the test bed. If it is determined at step 910 that the user elects to clean the test bed, networking software is loaded on each device included on the selected test bed at step 912. For example, a copy image routine may be used to locate networking software associated with the log file and then load the networking software on the corresponding devices (e.g., routers). At step 910, if it is determined that the user does not wish to clean the test bed (e.g., the user wishes to test networking software previously installed on the test bed), the test bed is left in its current state at step 914.

Figure 10:
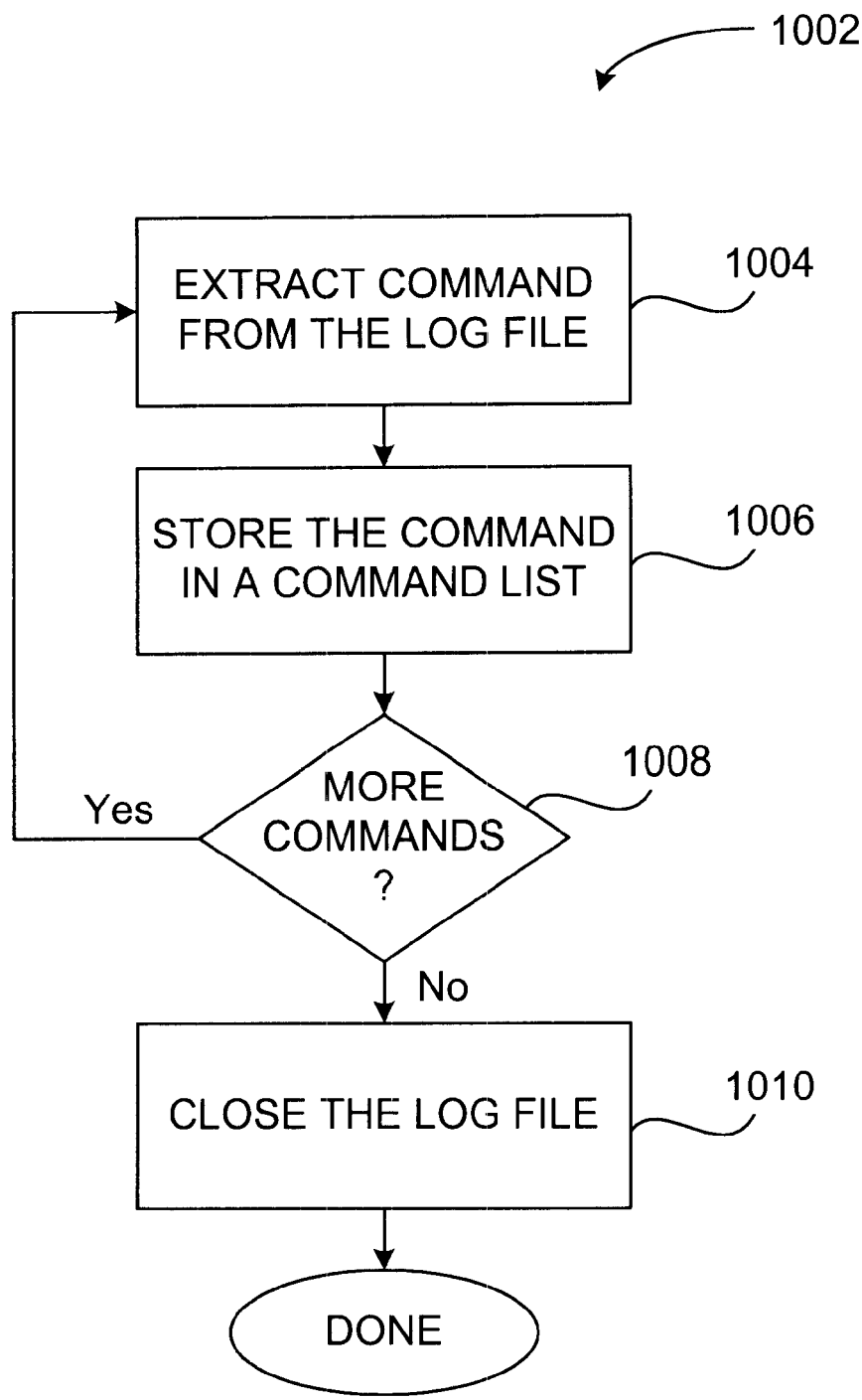
FIG. 10 is a flow diagram illustrating a method for extracting each command from the log file 1002 according to an embodiment of the invention.

Referring now to FIG. 10, a method for extracting each command from the log file 1002 according to an embodiment of the invention is presented. Each command may be extracted and displayed consecutively as the log file is read. Alternatively, all commands may be extracted, then displayed. This requires each command to be stored in a command list, array or other data structure.

At step 1004, a command is extracted from the log file using a log file parser. The log file parser is developed to recognize syntactic patterns in the log file. This allows the plurality of commands in the log file to be parsed through pattern recognition of various character strings delimiting each command from any associated output. The location and format of these strings will vary depending on the command as well as the tool creating the log file. For example, a particular command may not have an associated output. As yet another example, a time stamp may be included for various commands, delimiting the command from the associated output. The log file parser may include a set of procedures to identify each possible pattern that may occur in the log file. Therefore, the log file parser may be easily modified to accomodate revisions and enhanced to allow recognition of new patterns.

Once a command has been extracted from the log file, the extracted command is then stored in a command list at step 1006. Next at step 1008, if it is determined that more commands exist in the log file, the process continues at step 1004. However, if no more commands are to be read from the log file, the log file is closed at step 1010.

Figure 11:
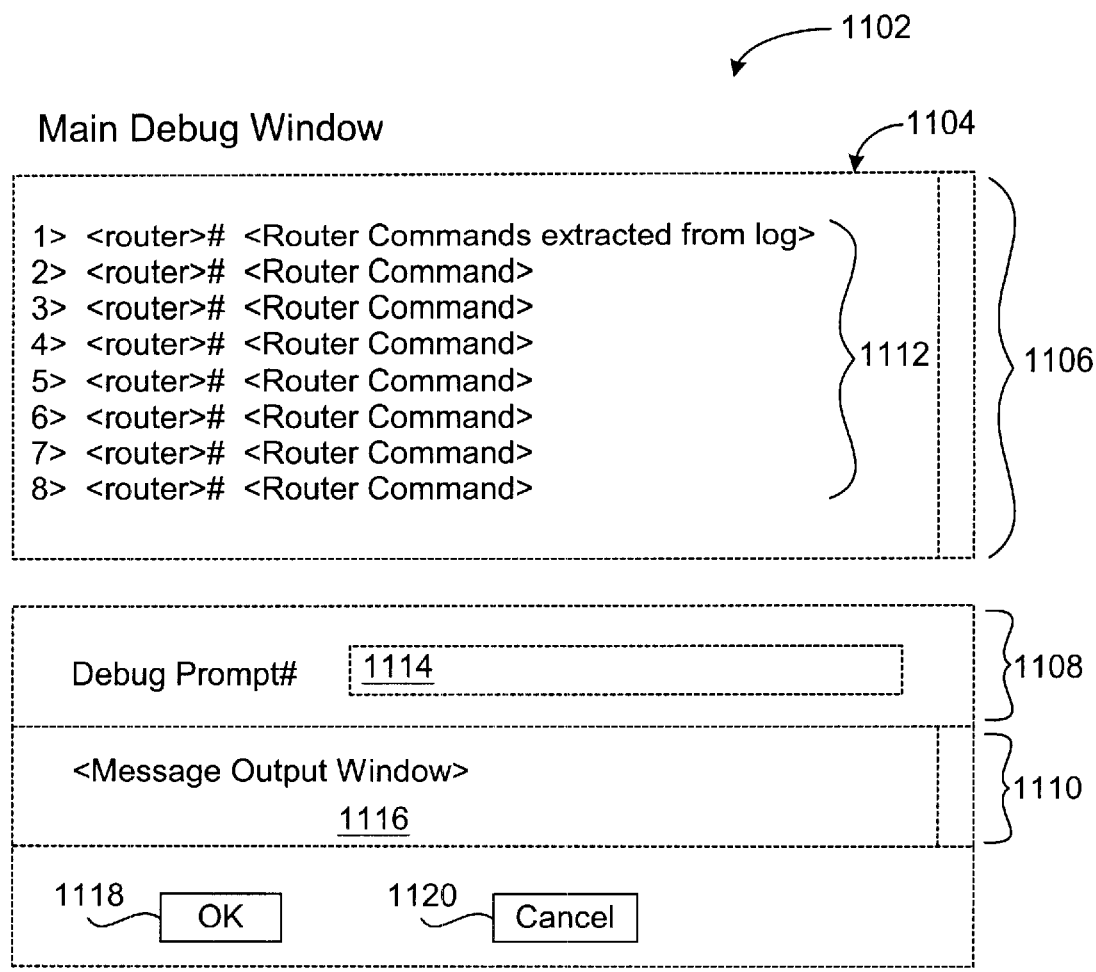
FIG. 11 is a diagram illustrating a user interface 1102 for debugging the source code through applying a set of the extracted commands according to one embodiment of the invention.

Referring next to FIG. 11, a user interface 1102 for debugging the source code through applying a set of the extracted commands according to one embodiment of the invention is presented. As shown, a main debug window 1104 includes an upper portion 1106, a middle portion 1108, and a lower portion 1110. The extracted commands 1112 from the log file are displayed in the upper portion 1106 of the debug window. In the middle portion 1108 of the debug window, a debug prompt 1114 is provided at which a user may enter a debug command. The lower portion 1110 of the debug window is a message output window 1116 for displaying any output associated with the debug command. For example, the debug command may provide information to assist a user in the debugging process (e.g., "SHOW HISTORY", which shows a history of recent commands). Once the user has entered a debug command at the debug prompt, the user selects "OK" 1118 to proceed with the debug command or "CANCEL" 1120 to cancel the debug command.

Figure 12:
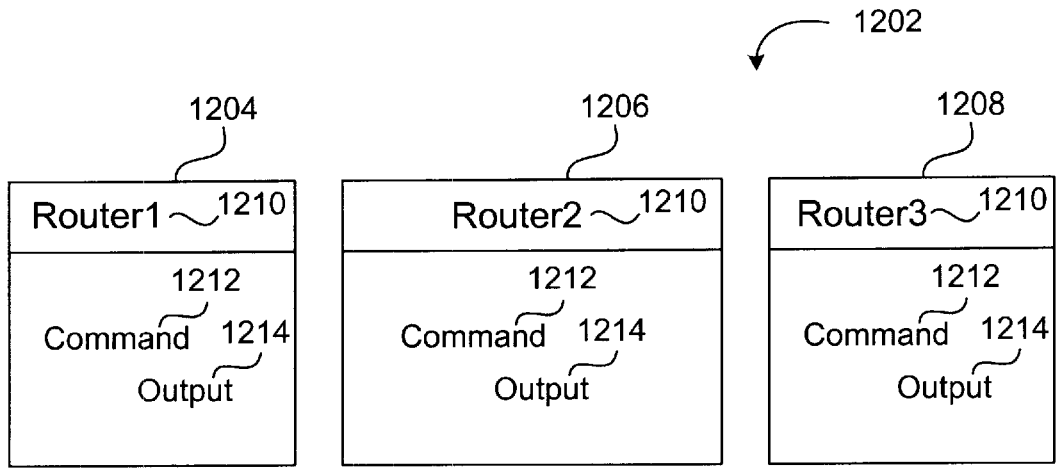
FIG. 12 is a diagram illustrating a user interface for displaying output for each device on the test bed 1202 according to one embodiment of the invention.

Referring next to FIG. 12, a user interface for displaying output for each device on the test bed 1202 according to one embodiment of the invention is presented. As shown, a first device window 1204 is provided for a first device, a second device window 1206 is provided for a second device, and a third device window 1208 is provided for a third device. In each of the windows, a device identifier 1210 (e.g., router identifier) is displayed. In addition, each command executed during the test session 1212 and any associated output 1214 are displayed in the corresponding window.

Figure 13:
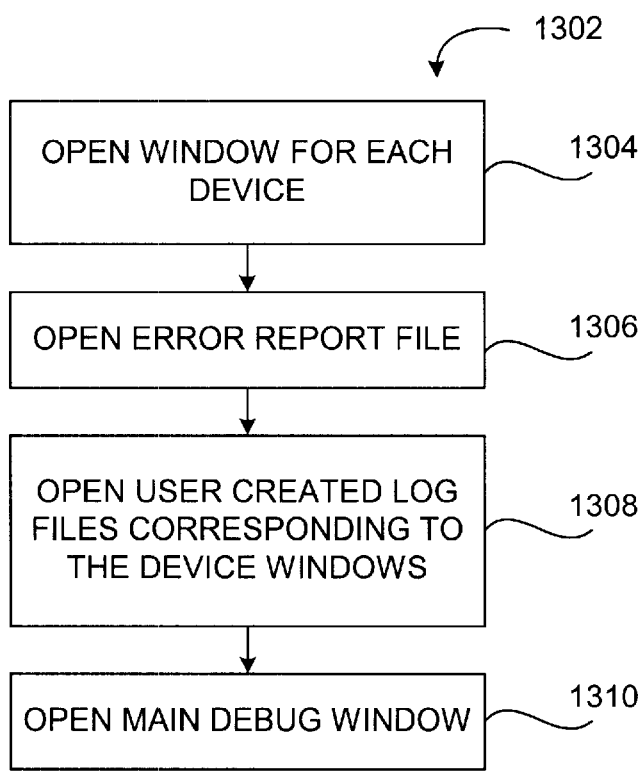
FIG. 13 is a flow diagram illustrating a method for opening files and display windows to be used during the testing session 1302 according to one embodiment.

Referring next to FIG. 13, a method for opening files and display windows to be used during the testing session 1302 according to one embodiment is presented. Prior to passing control to the user for debugging, all files and display windows used during the debugging process are opened. At step 1304, a window, or "console", is opened for each device on the test bed. For example, if the test bed includes three devices, three windows will be created as shown in FIG. 12. This allows the user to observe output produced by each device during the debugging process. Alternatively, each of the device consoles may also be opened only upon execution of a command associated with the corresponding device. Next, at step 1306, an error report file is opened. In addition, the error report file is prepared with a basic structure to facilitate logging of commands and outputs during the testing session. However, if an error report is manually created by the testing engineer, this step may be eliminated. At step 1308, one or more user created log files are opened so that commands executed during the debugging session may be recorded. According to a preferred embodiment, one log file is opened for each of the devices on the test bed. Thus, the information provided in each of the device consoles shown in FIG. 12 may be logged in an associated log file. Moreover, a single combined log file may be generated which contains testing data for all of the devices. However, if the only output desired is an error report, this step may be optionally provided. At step 1310, the main debug window shown in FIG. 11 is opened. After all display windows and files have been opened, the extracted commands may be displayed.

Figure 14:
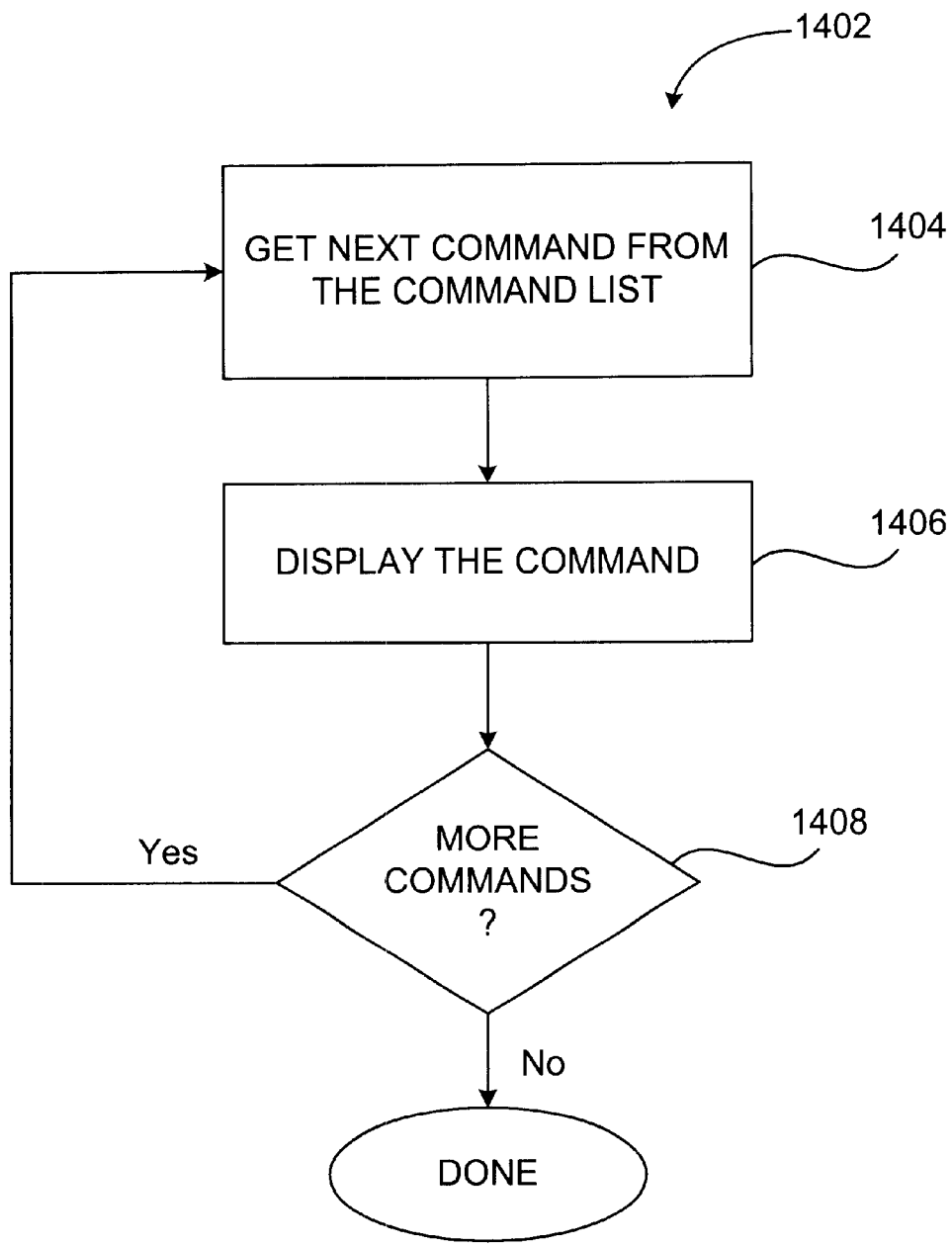
FIG. 14 is a flow diagram illustrating a method for displaying the list of commands extracted from the log file 1402 according to an embodiment of the invention.

Referring next to FIG. 14, a method for displaying the list of commands extracted from the log file 1402 according to an embodiment of the invention is presented. At step 1404, a command is obtained from the command list. Next, the obtained command is displayed at step 1406 in the upper portion of the debug window shown in FIG. 11. If it is determined at step 1408 that more commands are included in the command list, the process continues at step 1404. If all commands have been displayed, the process is completed.

Figure 15:
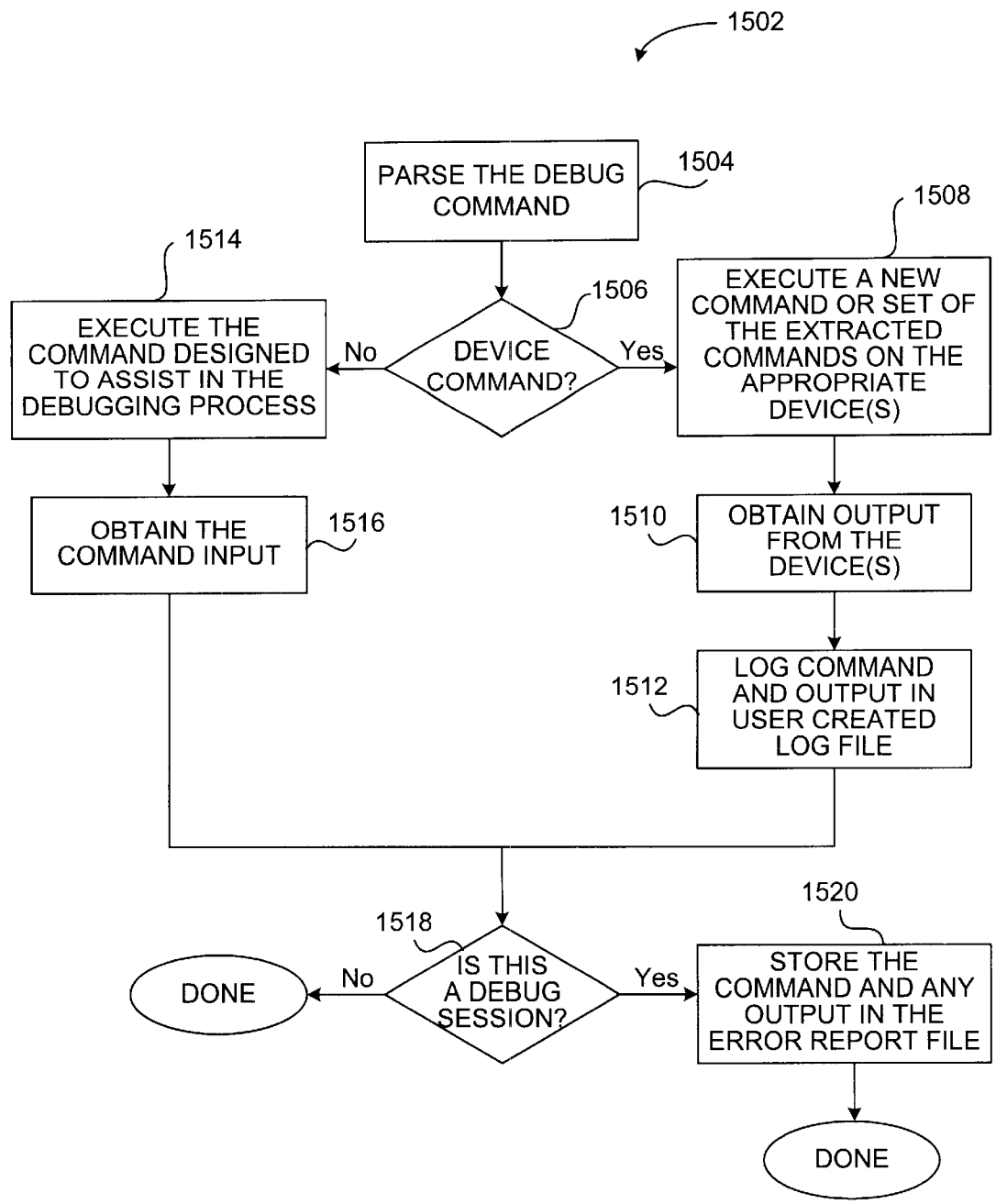
FIG. 15 is a flow diagram illustrating a method for executing and logging a debug command 1502 according to an embodiment of the invention.

Referring next to FIG. 15, a method for executing and logging a debug command 1502 according to an embodiment of the invention is illustrated. At step 1504, the debug command obtained from the user is parsed using a command parser. If the debug command is determined to be a device command at step 1506, the device command is executed on the appropriate device(s) at step 1508. As described above, the device command may include a new command or a command that runs a set of the extracted commands. Next, output is obtained from the device(s) at step 1510. By way of example, a send command procedure may be used to issue a command to the device and collect the output from the device. In addition, the send command procedure may display the output on the corresponding device window. At step 1512, the device command and any associated output is stored in the appropriate user created log file. For example, one user created log file may be produced during a testing session. However, as described above, according to one embodiment, a log file associated with each device (e.g., router) is created in addition to a main log file. Therefore, the information is logged accordingly.

If at step 1506, if it is determined that the debug command obtained from the user is designed to assist in the debugging process, a procedure associated with the debug command is executed at step 1514. Next, at step 1516, any output produced by the procedure (or function) is obtained.

Next, at step 1518, if it is determined that the testing session is a debug session (e.g., the user wishes to log the commands run in an error report file), information is logged in the error report file at step 1520. For example, the debug command and/or any associated commands in the extracted commands which are run are stored in the error report file along with output produced by the device(s) (e.g., routers). Alternatively, the commands may be stored in an error report command list and logged in the error report file upon exiting the system. According to one embodiment, the debug session produces a log file including all commands entered during the testing session. According to yet another embodiment, the user indicates that the testing session is a debug session through the use of specific debug commands: "DEBUG START" and "DEBUG STOP". By way of example, a user may enter "DEBUG START" to indicate that all commands following the debug command (and associated outputs) are to be logged in the error report file. Similarly, the user may enter "DEBUG STOP" to indicate that any commands following are not to be logged in the error report file. Thus, the debug session may be indicated through the use of a flag which is set in response to the "DEBUG STOP" and "DEBUG START" commands. Similarly, logging of commands within the user created log files for each device may be performed using similar "START" and "STOP" commands.

The debug command entered by the user may include various commands. As described above, the debug command may include a new command. In addition, the debug command may be one of a set of debug commands recognizable by the command parser. The set of debug commands may include commands designed to run a set of the extracted commands or may be provided merely to assist the user in the debugging process. An exemplary set of debug commands is as follows:

| Commands designed to assist in the debugging process: | |
|---|---|
| Alias | : Aliases command names. |
| Break | : Sets break point at the designated point. |
| Clear | : Discards all the break points. |
| Debug start | : Indicates that all following commands will be logged in the error report file. |
| Debug stop | : Indicates that all following commands will not be logged in the error report file. |
| Help | : Displays help on a specified command. |
| History | : Displays history of commands, as provided by UNIX. |
| Search <string> | : Searches in the command list for a specified string. The line in the extracted commands containing the specified string is then highlighted. |
| Set <line number> | : Sets the current pointer to point to one of the extracted commands corresponding to a specified line number. |

| Commands designed to assist in the debugging process: | |
|---|---|
| Show <aliases/break points/now> | : "Show aliases" displays all existing aliases. "Show break points" displays all existing break points. In addition, "show now" displays the current pointer value. |
| Unalias | : Discards all the existing aliases or the specified alias. |

| Commands designed to run a set of the extracted commands on the test bed: | |
|---|---|
| Analyze | : Executes the analyze section as defined in the test script. |
| Config | : Executes configuration section as defined in the script. |
| Next | : Executes the next <number> number of device (e.g., router) commands |
| Reset | : Executes the unconfigure section and resets the line counter in the extracted commands to 1. |
| Run | : Continue execution until a break point or end is encountered. |
| Step | : Executes through the specified number of commands. |
| Unconfig | : Executes the unconfigure section as defined in the test script. |

Figure 16:
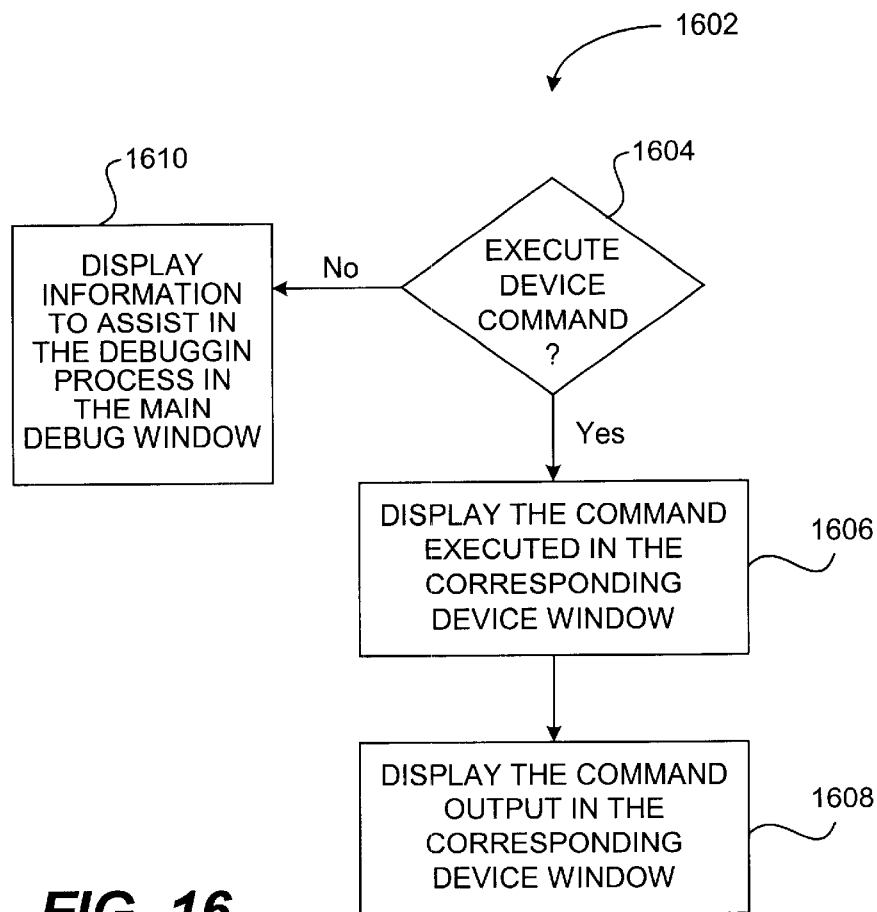
FIG. 16 is a flow diagram illustrating a method for displaying output associated with a debug command entered by a user 1602 according to one embodiment of the invention.

Referring next to FIG. 16, a method for displaying output associated with a debug command entered by a user 1602 according to one embodiment of the invention is presented. Since various debug commands do not produce any output (e.g., "DEBUG START"), this method is optional. At step 1604, it is determined whether the executed debug command is a device command or a command designed to obtain further information. As described above, the device command is a new command or a command which executes a set of the extracted commands (e.g., STEP command). If the debug command is a device command, the device command and/or the set of extracted commands are displayed in the corresponding device window at step 1606. In addition, the command output for each device on the test bed is displayed in the corresponding device window at step 1608. Since the device window is displayed to assist in the testing process, other mechanisms for providing this output to the user are possible. If the debug command is not a device command (e.g., it is a request for information to assist in the debugging process), information associated with the particular debug command is displayed at step 1610 in the lower portion of the main debug window.

Figure 17:
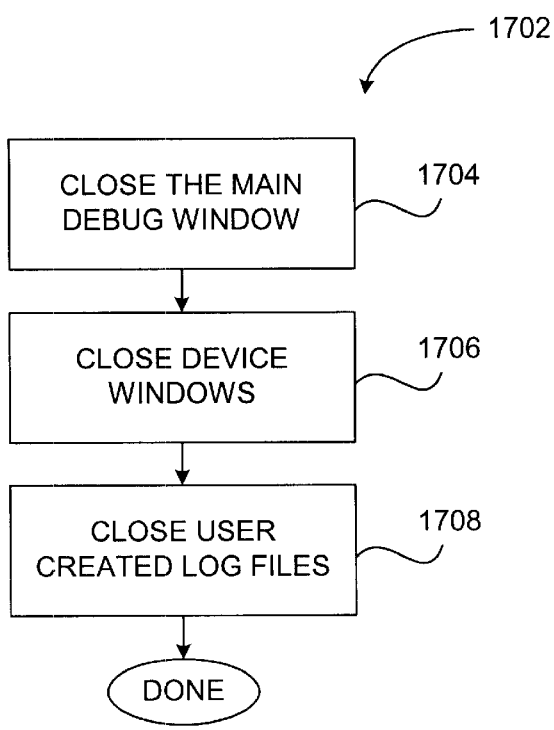
FIG. 17 is a flow diagram illustrating a method for closing display windows and files used during the testing session 1702 according to one embodiment of the invention.

Referring next to FIG. 17, a method for closing display windows and files used during the testing session 1702 according to one embodiment of the invention is illustrated. Prior to creating the automated error report, each of the display windows and the user created log files is closed. At step 1704, the main debug window is closed. Similarly, at step 1706, each device window displaying the commands and outputs associated with the corresponding device is closed. Next, at step 1708, each user created log file associated with the devices and any main log file are closed. Since these steps are performed upon completion of the debugging session, these steps are performed prior to the generation of the automated error report. However, these completion steps may also be performed after the creation of the automated error report.

Figure 18:
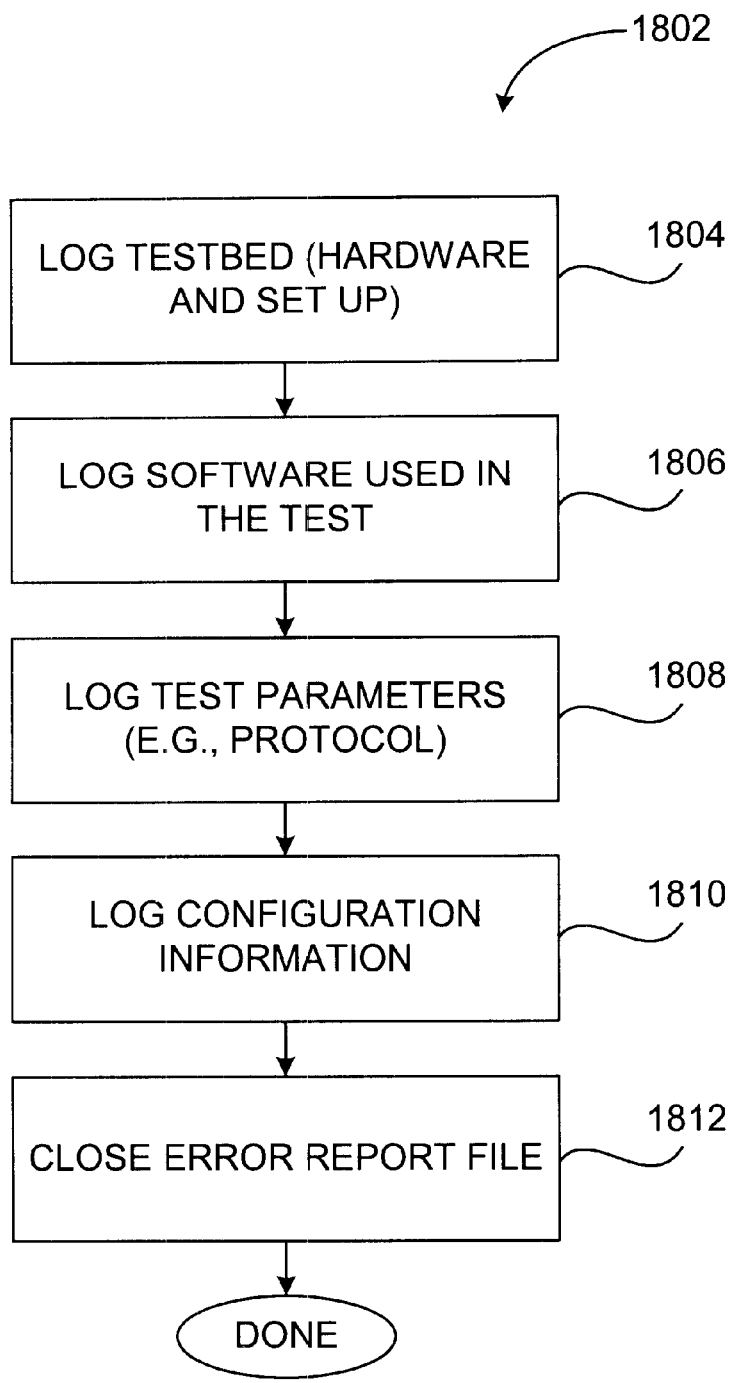
FIG. 18 is a flow diagram illustrating a method for creating an automated error report 1802 according to one embodiment of the invention.

Referring next to FIG. 18, a method for creating an automated error report 1802 according to one embodiment of the invention is presented. Information in the error report is provided in several sections. Some of these sections are completed by the present invention, while others may be left to be manually completed by the test engineer. Examples of information that can be added automatically are the software version tested, hardware on which the software was run, test case parameters (e.g., router protocol), test configuration loaded on the router (e.g., configuration section), and user-specified command outputs (e.g., outputs obtained in response to "DEBUG START" and "DEBUG STOP" commands). Other information such as problem description and commands may be added manually by the test engineer. Accordingly, since further and alternative steps may be performed during error report generation, the following steps are merely illustrative.

At step 1804, the selected test bed used during the testing session is logged in the error report file. By way of example, the hardware and configuration of the hardware on the test bed is logged. At step 1806, information relating to the source code installed on the test bed (e.g., software version) is logged. Moreover, test parameters relating to the test session (e.g., protocol) may be logged at step 1808. In addition, configuration information is stored in the error report file at step 1810. By way of example, the configuration information may include the extracted commands such as the configuration commands. As described above, each command logged during the debugging session has been previously stored in the error report file. In addition, the error report file may contain other information which may be used to later recreate the testing session. For example, the error report file may further include the list of extracted commands as well as each of the user created log files produced during the testing session. In addition, the invention may provide a user with the option of manually entering additional information. After all information is logged in the error report file, the error report file is closed at step 1812. Moreover, error notification may be provided in a variety of ways. Upon completion of the testing session, the error report file may be stored in a directory containing the other log files and a file containing the extracted commands. According to one embodiment, upon closing the error report file, a notification may be sent via e-mail to the test engineer and/or other individuals which includes the error report and may contain other information describing the testing session.

Figure 19:
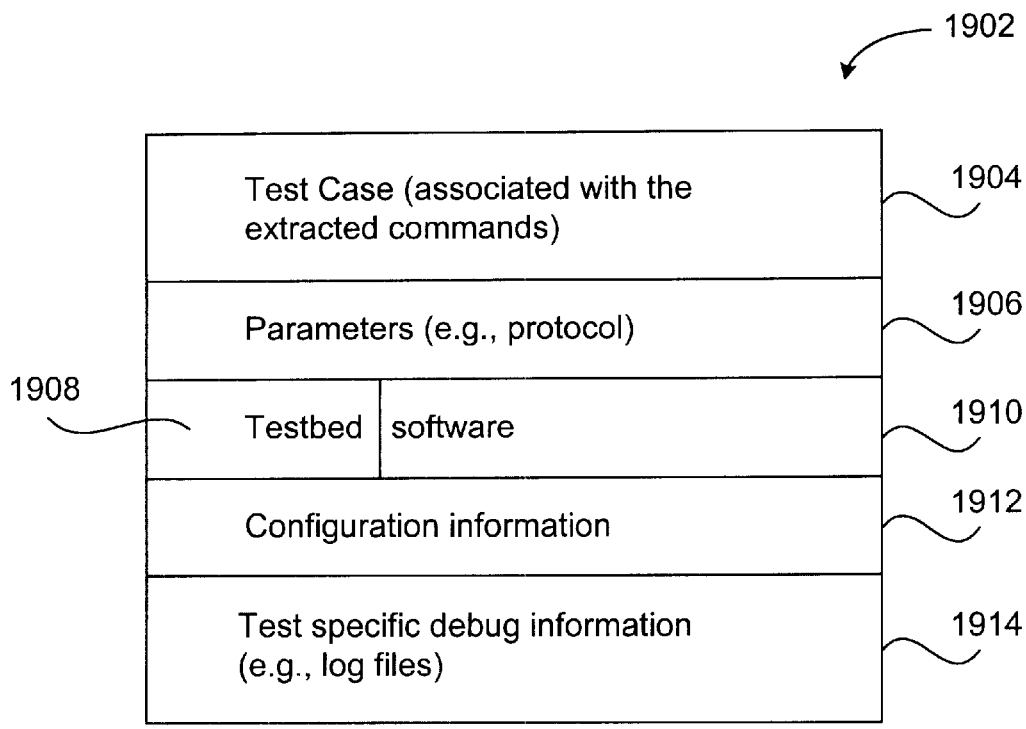
FIG. 19 is a diagram illustrating an exemplary data structure for storing an error report 1902 according to one embodiment of the invention.

Referring next to FIG. 19, an exemplary data structure for storing an error report 1902 according to one embodiment of the invention is illustrated. As shown, the error report may include information relating to the selected test case 1904 (e.g., location of the selected test case). In addition, test parameters 1906 such as the routing protocol may be stored in the error report. As shown, information relating to the test bed 1908 and software installed on the test bed 1910 are logged. Moreover, configuration information 1912 (e.g., configuration section of the extracted commands) may be included in the error report. Similarly, test specific debug information such as log files generated during the testing session may be included in the error report. In order to adequately document the testing session, further information may be logged by the system or the test engineer as necessary.

Figure 20:
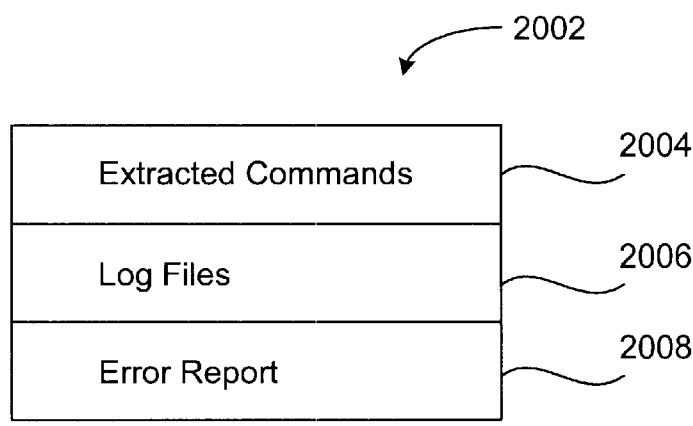
FIG. 20 is a diagram illustrating an exemplary data structure for storing information in a file upon completion of the testing session 2002 according to one embodiment of the invention.

Referring next to FIG. 20, an exemplary data structure for storing information in a file upon completion of the testing session 2002 according to one embodiment of the invention is illustrated. As shown, the extracted commands 2004, the log files 2006, and the error report 2008 are included in the file. The file may include an e-mail sent to the testing engineer or other individuals containing this data. Alternatively, an e-mail may be sent to notify the appropriate individuals of the location of this file upon completion of the testing session.

Although illustrative embodiments and applications of this invention are shown and described herein, many variations and modifications are possible which remain within the concept, scope, and spirit of the invention, and these variations would become clear to those of ordinary skill in the art after perusal of this application. Broadly speaking, the operations described above may be used to debug networking software. By way of example, the above described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a computer system, an automated method for testing communication software, comprising:

requiring a log file selection, the log file including a plurality of commands;

obtaining a selection of a set of communication software, the communication software adapted for enabling communication between a set of devices;

displaying the plurality of commands; and debugging the set of communication software using a set of the plurality of commands.

2. The method as recited in claim 1, wherein the set of communication software is networking software.

3. The method as recited in claim 1, wherein obtaining a selection of a set of communication software further includes:

obtaining a selection of a test bed, the test bed having at least one router on which the set of communication software is installed.

4. The method as recited in claim 3, wherein obtaining a selection of a test bed further includes:

loading a new set of communication software on the test bed.

5. The method as recited in claim 1, wherein requiring a log file selection further includes:

displaying a set of test cases, each one of the set of test cases being associated with one of a plurality of log files;

selecting one of the set of test cases; and opening one of the plurality of log files associated with the selected one of the set of test cases.

6. The method as recited in claim 1, wherein displaying the plurality of commands further includes:

extracting the plurality of commands from the log file.

7. The method as recited in claim 1, wherein debugging the set of communication software further includes:

running the set of the plurality of commands on the communication software.

8. The method as recited in claim 1, wherein debugging the set of communication software further includes:

obtaining a debug command; and running a set of the plurality of commands associated with the debug command on the communication software.

9. The method as recited in claim 1, wherein debugging the set of communication software further includes:

obtaining a debug command, wherein the debug command is a new command;

executing the debug command on the set of communication software;

obtaining output from the set of communication software; and displaying the output.

10. The method as recited in claim 9, further including: logging the debug command and the output in a log file.

11. The method as recited in claim 1, wherein debugging the set of communication software further includes:

obtaining a debug command; and displaying information to assist in the debugging process, the information being associated with the debug command.

12. The method as recited in claim 1, wherein debugging the set of communication software further includes:

executing one of the plurality of commands on the communication software;

obtaining output from the communication software; and displaying the output.

13. The method as recited in claim 12, further including:

logging the one of the plurality of commands in a log file; and logging the output in the log file.

14. The method as recited in claim 1, wherein debugging the set of communication software further includes:

providing a display for each one of the set of devices, the display including each one of the set of the plurality of commands associated with a device and corresponding output.

15. The method as recited in claim 1, wherein debugging the set of communication software further includes:

executing the set of the plurality of commands on the communication software; and generating a log file including the set of the plurality of commands and associated outputs.

16. The method as recited in claim 1, wherein debugging the set of communication software further includes:

executing the set of the plurality of commands on the set of devices; and generating a log file for each one of the set of devices, the generated log file including each one of the plurality of commands executed on the one of the set of devices and associated outputs.

17. The method as recited in claim 7, wherein debugging the set of communication software further include:

displaying a screen providing information to assist a user in obtaining a selection of the set of the plurality of commands.

18. The method according to claim 17, wherein the information indicates failed ones of the plurality of commands.

19. The method according to claim 1, wherein the log file is associated with a test script, the test script including configuration commands for configuring one or more of the set of devices, analyze commands, and unconfigure commands, the plurality of commands in the log file comprising at least one of the configuration commands, analyze commands, and unconfigure commands.

20. The method as recited in claim 1, further including:

creating an error report, the error report including the set of the plurality of commands.

21. In a computer system, an automated method for testing communication software, comprising:

obtaining a selection of a test bed, the test bed including at least one device having communication software;

requiring a log file selection, the log file including a plurality of commands, each one of the plurality of commands associated with a device;

displaying the plurality of commands;

executing a set of the plurality of commands on the test bed;

obtaining output from the test bed; and displaying the output.

22. In a computer system, an automated method for testing networking software, comprising:

obtaining a selection of a test bed, the test bed having a plurality of routers, each one of the plurality of routers having networking software;

requiring a log file selection, the log file including a plurality of commands, each one of the plurality of commands associated with one of the plurality of routers;

displaying the plurality of commands; and debugging the networking software associated with each one of the plurality of routers using a set of the plurality of commands.

23. The method as recited in claim 22, wherein debugging the networking software further includes:

executing one of the plurality of commands on the test bed;

obtaining output from the plurality of routers installed on the test bed; and displaying the output obtained from the plurality of routers.

24. In a computer system, an automated method for generating an error report, comprising:

obtaining a selection of a test bed, the test bed including at least one device having communication software;

requiring a log file selection, the log file including a plurality of commands, each one of the plurality of commands associated with a device;

displaying the plurality of commands;

executing a set of the plurality of commands on the test bed;

obtaining output from the test bed; and logging the set of the plurality of commands and the output in an error report.

25. In a computer system, an automated method for providing error notification during testing of communication software, comprising:

obtaining a selection of a test bed, the test bed including at least one device having communication software;

requiring a log file selection, the log file including a plurality of commands, each one of the plurality of commands associated with a device;

displaying the plurality of commands;

executing a set of the plurality of commands on the test bed;

obtaining output from the test bed; and providing the output in a file.

26. In a computer system, an automated method for generating a log file, comprising:

obtaining a selection of a test bed, the test bed including at least one device having communication software;

requiring a log file selection, the log file including a plurality of commands, each one of the plurality of commands associated with a device;

displaying the plurality of commands;

executing a set of the plurality of commands on the test bed;

obtaining output from the test bed; and storing the set of the plurality of commands and the output in a generated log file.

27. The method as recited in claim 26, wherein storing the set of the plurality of commands is performed in response to an indication that a log file is desired.

28. An automated debugging tool for testing communication software in a computer system, comprising:

means for requiring a log file selection, the log file including a plurality of commands;

means for obtaining a selection of a set of communication software, the communication software adapted for enabling communication between a set of devices;

means for displaying the plurality of commands; and means for debugging the set of communication software using a set of the plurality of commands.

29. A computer-readable medium recording software, the software disposed on an automated computer to perform a method for debugging communication software, the method comprising:

requiring a log file selection, the log file including a plurality of commands;

obtaining a selection of a set of communication software, the communication software adapted for enabling communication between a set of devices;

displaying the plurality of commands;

debugging the set of communication software using a set of the plurality of commands.

30. A computer system for automating debugging communication software, comprising:

a processor; and a memory having stored therein the following:

a module for requiring a log file selection, the log file including a plurality of commands;

a module for obtaining a selection of a set of communication software, the communication software adapted for enabling communication between a set of devices;

a module for displaying the plurality of commands; and a module for debugging the set of communication software using a set of the plurality of commands.

31. In a computer system, a method for debugging an automated set of source code, comprising:

obtaining a log file including a plurality of test commands for testing a set of source code;

providing a set of debugging commands for executing a set of the plurality of test commands; and debugging the set of source code using the set of debugging commands.

32. The method as recited in claim 31, wherein the set of source code includes communication software which enables communication between a set of devices.

33. In a computer system, an automated method for debugging a set of source code, comprising:

obtaining a plurality of test commands for testing a set of source code;

executing a set of the plurality of test commands on the set of source code to create a log file; and testing the source code using the log file, wherein the set of source code includes communication software which enables communication between a set of devices.

34. A method for debugging a set of source code, comprising:

obtaining a first set of source code;

executing a set of test commands on the first set of source code to create a log file; and testing a second set of source code using the log file.

35. The method as recited in claim 34, wherein the first set of source code is a first set of communication software and the second set of source code is a second set of communication software, the first and second sets of communication software adapted for enabling communication between a set of devices.

36. A computer-readable medium storing thereon computer-readable instructions for debugging a set of source code, comprising:

instructions for obtaining a first set of source code;

instructions for executing a set of test commands on the first set of source code to create a log file; and instructions for testing a second set of source code using the log file.

37. An apparatus for debugging a set of source code, comprising:

means for obtaining a first set of source code;

means for executing a set of test commands on the first set of source code to create a log file; and means for testing a second set of source code using the log file.

38. An apparatus for debugging a set of source code, comprising:

a processor; and a memory, at least one of the processor and the memory being adapted for:

obtaining a first set of source code;

executing a set of test commands on the first set of source code to create a log file; and testing a second set of source code using the log file.

* * * * *